United States Patent
Hogan

[15] 3,666,736
[45] May 30, 1972

[54] LOW DENSITY ETHYLENE-BUTENE COPOLYMERS

[72] Inventor: John P. Hogan, Bartlesville, Okla.
[73] Assignee: Phillips Petroleum Company
[22] Filed: Mar. 24, 1969
[21] Appl. No.: 809,936

[52] U.S. Cl. .....................................................260/88.2 R
[51] Int. Cl. ......................................................C08f 15/04
[58] Field of Search.....................260/88.2 A, 94.9 D, 88.2 R

[56] References Cited

UNITED STATES PATENTS

| | | | |
|---|---|---|---|
| 2,980,659 | 4/1961 | Witt | 260/88.2 |
| 3,067,184 | 12/1962 | Cines | 260/88.2 |
| 3,174,957 | 3/1965 | Hall | 260/88.2 |
| 3,227,699 | 1/1966 | Rendon | 260/88.2 |
| 3,242,150 | 3/1966 | Scoggin | 260/88.2 |
| 3,288,767 | 8/1962 | Hogan | 260/88.2 |
| 3,349,067 | 10/1967 | Hill | 260/88.2 |
| 3,445,367 | 5/1969 | Kallenbach | 260/94.9 |
| 3,446,754 | 5/1969 | Solvik | 252/458 |
| 3,130,188 | 4/1964 | Hogan | 260/94.9 |
| 3,509,116 | 4/1970 | Cote et al. | 260/88.2 |
| 3,177,184 | 4/1965 | Cottle | 260/88.2 |
| 3,562,241 | 2/1971 | Witt | 260/94.9 |

OTHER PUBLICATIONS

Polythene second edition edited by A. Renfrew and Phillip Morgan, London: Iliffe & Sons Ltd., New York: Interscience Publishers pp. 349 to 358, 1960

*Primary Examiner*—Joseph L. Schofer
*Assistant Examiner*—Roger S. Benjamin
*Attorney*—Young and Quigg

[57] ABSTRACT

Low density ethylene-butene-1 copolymers which are highly resistant to environmental stress cracking, characterized by freedom from surface stickiness, and have a ratio of weight average to number average molecular weight within the range of 6 to 20.

3 Claims, No Drawings

LOW DENSITY ETHYLENE-BUTENE COPOLYMERS

BACKGROUND OF THE INVENTION

Heretofore, low density polyethylene has been made by classical methods involving polymerization at several thousand atmospheres. It is characterized by numerous long-chain branches, and by an extremely low degree of vinyl unsaturation. There has been large scale commercial production of low density polyethylene for many years but the material is often deficient in environmental stress cracking resistance which limits its usefulness and applicability for many purposes, such as pipe, wire coating, bagging and packaging of detergents.

Ethylene-butene-1 copolymers have heretofore been produced. These are of higher density than low density polyethylene and have, to a substantial degree, filled in the gap between low density polyethylene having a density of about 0.92 and high density polyethylene having a density of 0.95 or higher. As the density of such copolymers is decreased toward about 0.93, they tend to become "cheesy" and have a tendency to bleed when oven-aged. Such a copolymer is described in Table I of my U.S. Pat. No. 3,102,876, Run No. 1. That patent deals with the copolymerization of butadiene with the ethylene and butene-1 to provide a polymer wherein the bleeding problem is eliminated. The resulting polymers accordingly are characterized by freedom from surface stickiness.

Ethylene-butene-1 copolymers, although substantially better than most varieties of low density polyethylene in environmental stress cracking, do not approach the stress cracking resistance value ($F_{50}$) of greater than 100 which is required for many heavy-duty applications in pipe, wire coating, bagging and detergent packaging.

DESCRIPTION OF THE INVENTION

I have now provided, as a new material of commerce, ethylene-butene-1 copolymers having a density within the range of 0.920 to 0.930 grams per cubic centimeter which are characterized by freedom from surface stickiness and an environmental stress cracking resistance ($F_{50}$) of greater than 100. The copolymers incorporate 5 to 9 percent by weight of butene-1 and have 14 to 21 ethyl branches per 1,000 carbon atoms. The ratio of weight average to number average molecular weight of my novel copolymers is within the range of 6 to 20.

The foregoing combination of properties adapts my novel copolymers for heavy-duty applications in pipe, wire coating, bagging and detergent packaging which have hitherto been unattainable with low density olefin polymers. Optimum properties for the above applications are obtained by copolymers within the more restricted density range of 0.923 to 0.927 grams per cubic centimeter.

The copolymers of the invention are distinguishable from low density polyethylene in that they contain ethyl branches as distinguished from long-chain branches (measured as butyl or longer), and also by the presence of substantial vinyl unsaturation.

The novel copolymers are further distinguished over previously known ethylene-butene-1 copolymers by their density and molecular weight distribution, i.e., ratio of weight average to number average molecular weight. The environmental stress cracking resistance is significantly greater than that of the previously known copolymers. Moreover, as further distinguished from the prior art copolymers, copolymers of the invention are free from bleeding and surface stickiness, and do not have a "cheesy" feel. The latter advantages are enhanced where the copolymers have a melt index below 0.5, and contain 0.5 to 0.7 vinyl groups per 1,000 carbon atoms. The low melt index polymers have a further advantage in their production, in that problems of reactor fouling are overcome or greatly minimized.

In the following table, I have compared the properties of the copolymers of this invention, Copolymer A and Copolymer B, with those of commercial low density polyethylene and with a copolymer such as described in Table I of the aforementioned U.S. Pat. No. 3,102,876, which is designated "Copolymer Control."

TABLE I

|  | copolymer A | copolymer B | Commercial low density polyethylene | Copolymer control |
|---|---|---|---|---|
| Density | 0.9255 | 0.9237 | 0.927 | >0.93 |
| Melt Index | 0.13 | 0.10 | 0.15 | 2.0 |
| Weight Average Molecular Weight | 213,000 |  | 165,000 | 259,000 |
| Number Average Molecular Weight | 17,700 |  | 27,600 | 7,900 |
| Ratio, Weight Average to Number Average Molecular Weight | 12.0 |  | 6.0 | 33.0 |
| Elongation, % | 360 |  | 565 | 73 |
| Tensile Strength at Yield, Pounds per Square Inch | 1800 |  | 2100 | 1980 |
| Flexural Modulus, Pounds per Square Inch | 69,000 |  | 60,000 | 75,000 |
| Hardness | 55 |  | 58 | 56 |
| Long Chain Branches (Butyl or longer) per Thousand Carbon Atoms | — | — | 22 | — |
| Ethyl Branches per Thousand Carbon Atoms | 16 | 16 | — |  |
| Trans Internal Unsaturation Groups per Thousand Carbon Atoms | 0.1 | 0.1 | <0.1 |  |
| Vinyl Unsaturation, Groups per Thousand Carbon Atoms | 0.6 | 0.6 | <0.1 |  |
| Branched Vinyl Unsaturation, Groups per Thousand Carbon Atoms | 0.2 | 0.1 | 0.2 |  |
| Environmental Stress Cracking Resistance, Hours ($F_{50}$) | >1000 | >1000 | 65 | <20 |
|  | Not cheesy—no bleeding |  |  | Cheesy—Considerable bleeding |

The foregoing data show that the stress cracking resistance of my novel copolymers is over 50 times greater than that of the Copolymer Control and many times greater than that of the commercial low density polyethylene. No bleeding or surface stickiness was indicated for the copolymers of the invention by an oven-aging test at 140° F., whereas considerable bleeding occurred with the Copolymer Control. Thus, the copolymers of the invention are characterized by freedom from surface stickiness.

Comparing the copolymers of the invention with the commercial low density polyethylene, it is apparent that the copolymers are characterized by substantial ethyl branching and vinyl unsaturation whereas the low density polyethylenes have great numbers of long-chain branches and substantially no vinyl unsaturation.

Finally, comparing the copolymers of the invention with the Copolymer Control, it is apparent that the copolymers of the invention have lower density and are characterized by a significantly lower ratio of weight average molecular weight to number average molecular weight.

In the above data, density was determined by a gradient column upon specimens which had been molded at a temperature slightly higher than the melting point and then were cooled at a rate of 14° F. per minute (ASTM D 1505–63T).

Molecular weight distribution is indicated by the ratio of the weight average molecular weight to the number average molecular weight. A high value for this ratio is indicative ratio is indicative of a broad molecular weight distribution. Both weight average and number average molecular weight were determined by gel permeation chromatography (GPC), as described by J. C. Moore, *J. Polymer Science*, Part A, Volume 2, pages 835–843 (1964). Calibration of the GPC method was by membrane osmometry (for number average molecular weight) and light scattering (for weight average molecular weight).

The tensile properties were determined by ASTM D 638–61T upon specimens which were compression molded at a temperature slightly above the melting point and cooled at a rate of 25°±5° F per minute. The rate of draw was 20 inches per minute.

Flexural modulus was determined by ASTM D 790–63.

The hardness was determined by ASTM Method D 1706–61.

Environmental stress cracking was determined by ASTM D 1693–66.

Ethyl branching was indicated by an infrared absorption band at 13 microns while long-chain branches were indicated by absorption at 11.2 microns, after bromination to remove the interfering unsaturation band at 11.25 microns. The methyl groups terminating these branches were quantitatively measured at 7.25 microns utilizing a differential technique. Unsaturation was determined by measuring the characteristic bands at 10.35, 11.0 and 11.27 microns, the films being subsequently brominated to determine the amount of spectral interference.

Copolymer A was prepared by impregnating microspheroidal silica with chromium oxide and activating the catalyst for 5 hours at 1,400° F. The catalyst contained 1.9 weight per cent chromium trioxide. Ethylene feed containing 11 per cent 1-butene was contacted with the catalyst in the presence of isobutane diluent for 90 minutes at a temperature of 192° F. and a pressure of 330 pounds per square inch gage. The productivity was 2,150 pounds of polymer per pound of catalyst and the copolymer contained about 5 percent incorporated butene-1. 0.02 mol of hydrogen per mol of ethylene was charged to the reaction along with the feed.

Copolymer B was made by impregnating microspheroidal silica-alumina (88 weight percent silica, 12 weight per cent alumina) with chromium oxide and activating for 5 hours at 1,400° F. The resulting catalyst contained 2 weight per cent chromium trioxide. Ethylene feed containing 19 weight percent butene-1 was contacted with the catalyst in the presence of isobutane diluent for 90 minutes at a temperature of 200° F. and a pressure of 450 pounds per square inch gage. The productivity was 1,900 pounds of polymer per pound of catalyst, and the copolymer contained about 5 per cent incorporated butene-1.

The Copolymer Control was prepared by impregnating silica-alumina (88 weight per cent silica, 12 weight per cent alumina) with chromium trioxide and activating for 5 hours at 950° F. The resulting catalyst contained 2.6 weight percent chromium. The catalyst was contacted with ethylene feed containing 13 weight percent butene-1 for 120 minutes at a temperature of 250° F. and a pressure of 250 pounds per square inch gage in cyclohexane solvent. The productivity was 418 pounds of polymer per pound of catalyst and the polymer contained about 5.5 per cent of incorporated butene-1.

It will be apparent that I have achieved the objects of my invention in providing a low density (0.920 to 0.930) ethylene-butene-1 copolymer having excellent environmental stress cracking resistance together with freedom from bleeding and surface stickiness, the copolymer being characterized by a ratio of weight average to number average molecular weight within the range of 6 to 20.

The copolymers of the invention have excellent properties for use in heavy-duty applications such as pipe, wire coating, bagging and detergent packaging.

Other variations and modifications of this invention will be apparent to those skilled in the art without departing from the spirit and scope of the invention.

I claim:

1. An ethylene-butene-1 copolymer containing 5 to 9 percent by weight of butene-1, said copolymer having a density within the range of 0.920 to 0.930, 14 to 21 ethyl branches per 1,000 carbon atoms, a ratio of weight average to number average molecular weight within the range of 6 to 20, having a melt index below 0.5, 0.5 to 0.7 vinyl groups per 1,000 carbon atoms, an environmental stress cracking resistance ($F_{50}$) of greater than 100, and being characterized by freedom from surface stickiness.

2. The copolymer of claim 1 having an environmental stress cracking resistance ($F_{50}$) of greater than 1,000.

3. The copolymer of claim 2 having a density within the range of 0.923 to 0.927.

* * * * *